United States Patent
Yu

(10) Patent No.: US 8,468,260 B2
(45) Date of Patent: Jun. 18, 2013

(54) METHOD AND SYSTEM FOR CHANGING SELECTED HOME OPERATOR OF MACHINE TO MACHINE EQUIPMENT

(75) Inventor: Wantao Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/383,877

(22) PCT Filed: Mar. 31, 2010

(86) PCT No.: PCT/CN2010/071461
§ 371 (c)(1),
(2), (4) Date: Jan. 13, 2012

(87) PCT Pub. No.: WO2011/035572
PCT Pub. Date: Mar. 31, 2011

(65) Prior Publication Data
US 2012/0173743 A1 Jul. 5, 2012

(30) Foreign Application Priority Data

Sep. 25, 2009 (CN) .......................... 2009 1 0177843

(51) Int. Cl.
G06F 15/16 (2006.01)
(52) U.S. Cl.
USPC ........................................ 709/228; 455/432.1
(58) Field of Classification Search
USPC ............... 709/200, 227, 228; 455/411, 432.1, 455/433, 435.1
See application file for complete search history.

(56) References Cited

U.S. PATENT DOCUMENTS

| | | | |
|---|---|---|---|
| 7,096,014 B2 * | 8/2006 | Haverinen et al. | 455/432.1 |
| 2003/0119481 A1 * | 6/2003 | Haverinen et al. | 455/411 |
| 2008/0318550 A1 * | 12/2008 | DeAtley | 455/411 |
| 2009/0191857 A1 | 7/2009 | Horn et al. | |
| 2010/0197350 A1 * | 8/2010 | Jeung | 455/558 |
| 2011/0035584 A1 * | 2/2011 | Meyerstein et al. | 713/155 |

FOREIGN PATENT DOCUMENTS

| | | |
|---|---|---|
| CN | 101132567 A | 2/2008 |
| CN | 101409945 A | 4/2009 |
| EP | 1703760 A3 | 7/2011 |
| WO | 2009092115 A3 | 7/2009 |

OTHER PUBLICATIONS

S3-080948 3GPP TSG SA WG3 Security ad hoc, Sep. 23-26, 2008, Sophia-Antipolis, France, see the whloe document.
International Search Report for PCT/CN2010/071461 dated Apr. 28, 2010.

* cited by examiner

*Primary Examiner* — Moustafa M Meky
(74) *Attorney, Agent, or Firm* — Ling Wu; Stephen Yang; Ling and Yang Intellectual Property

(57) ABSTRACT

A method and a system for changing the Selected Home Operator (SHO) of a Machine to Machine Equipment (M2ME) are disclosed. The method includes: the M2ME establishing a connection with a Registration Operator (RO) through a Trusted Environment (TRE) functional entity, the RO registering the M2ME in the new SHO; the new SHO sending the new International Mobile Subscriber Identity (IMSI) to the RO or authorizing the RO to provide a new IMSI after it has passed the verification of the M2ME by the Platform Validation Authority (PVA); the RO sending the new IMSI to the M2ME through the connection established by the TRE functional entity; the M2ME replacing the old IMSI in the Universal Integrated Circuit Card (UICC) with the new IMSI; wherein the UICC and the TRE function entity are all located in the M2ME.

18 Claims, 5 Drawing Sheets

METHOD AND SYSTEM FOR CHANGING SELECTED HOME OPERATOR OF MACHINE TO MACHINE EQUIPMENT

TECHNICAL FIELD

The present invention relates to the Machine to Machine (M2M) communication technology, and more especially, to a method and a system for changing the Selected Home Operator (SHO) of a Machine to Machine Equipment (M2ME).

BACKGROUND OF THE RELATED ART

M2M communication is a wireless communication technology, a general term of a series of technologies and their combinations for implementing data communication and exchange between machine and machine and between machine and human. The M2M has two levels in the meaning: one is the machine itself, referred to smart equipment in the embedded design field; the second is the connection between machine and machine, and the machines are connected together through the network. The machine communication has a wide range of applications, such as smart metering, remote monitoring, tracking, medical, and so on, to make human life more intelligent. Compared with the traditional communication among peoples, the number of the M2MEs (Machine to Machine Equipments) is huge, and it has widespread applications, with huge market potential.

In M2M communication, the main long-distance connectivity technologies comprise GSM/GPRS/UMTS, and the short-distance connectivity technologies mainly are 802.11b/g, Bluetooth, Zigbee, RFID and so on. The M2M is a service focusing on equipments, since the M2M integrates the wireless communications and information technology, it can be used for two-way communication, such as remotely collecting information, setting parameters and sending commands, so as to achieve different applications, such as security monitoring, automatic vending and cargo tracking Almost all equipments involved in daily life are likely to become potential objects. The M2M provides a simple method for establishing a wireless connection for the equipment real-time data between systems, remote equipments, or the individuals.

One challenge of M2M communication is to deploy the remote security management of the M2M equipment. Therefore, we need to address how to remotely provide the M2ME with the subscription data, namely the MCIM (Machine Communication Identity Module), and to prevent the MCIM in the provision process from being accessed and used by an attacker. The MCIM application is a set of M2M security data and functions for accessing to the 3GPP network (which might be the IMS network). The MCIM might be located in the UICC (Universal Integrated Circuit Card), or might be located in a TRE (The Trusted environment) functional entity. When the MCIM is located in the UICC, the MCIM means the USIM (Universal Subscriber Identity Module) or the ISIM (IP Multimedia Services Identity Module). The TRE functional entity is a trusted environment functional entity provided by the M2ME, and one TRE functional entity might be authenticated by an external authorized agent at any time. The MCIM might be installed in the TRE functional entity, and the M2ME provides software and hardware protection and isolation to the MCIM via the TRE functional entity.

Currently, There are two methods for the M2ME to provide the M2M service: based on the UICC or based on the TRE functional entity.

When the M2ME provides the M2M service based on the UICC, there are the following two solutions about how to remotely change the subscription data, that is, change the selected home operator of the M2M equipment:

1. the solution in which the subscription data cannot be remotely changed, although this solution might be able to conveniently provide the M2M service to the M2ME, the UICC must be replaced when the M2M service subscriber wants to change the operator of the M2M service, which makes the M2ME maintenance very difficult, even if possible, the cost is very high, thus this solution cannot achieve the remote management of the MCIM of the M2ME;

2. the solution in which the subscription data can be remotely changed, in this solution, when the selected home operator is determined once the UICC is released, there is no problem of the initial MCIM provision, however, if the selected home operator is determined after the UICC is released, how to initially provide the MCIM to the UICC is a problem to be addressed; in addition, this solution changes the operator by changing the IMSI (International Mobile Subscriber Identity), although the M2ME can be easily managed with this solution, it involves transferring the IMSI between different mobile operator networks, thereby increasing the security risk of the M2ME subscription data; meanwhile, in the process of changing the IMSI, the UICC might interrupt the connection with any operator;

When the M2ME provides the M2M service based on the TRE functional entity, with the initial connection provided by the TRE functional entity, it installs the remotely provided MCIM in the TRE functional entity, with the disadvantage is that the MCIM protection depends on the security of the TRE function entity, since the TRE functional entity is achieved in the M2ME, the security of the TRE functional entity is lower than that of the UICC, thus the security of the MCIM in the TRE functional entity is not high; the solution of changing the selected home operator of the M2M equipment based on the TRE functional entity still has the problem that the security of the MCIM is relatively difficult to be guaranteed after the MCIM is provided to the TRE functional entity.

SUMMARY OF THE INVENTION

The technical problem to be solved by the present invention is to provide a method and a system for changing the selected home operator (SHO) of a machine to machine equipment (M2ME) to change the SHO of the M2ME by combining a trusted environment (TRE) functional entity and a universal integrated circuit card (UICC) together.

In order to solve the aforementioned technical problem, the present invention provides a method for changing the selected home operator (SHO) of a machine to machine (M2M) equipment, comprising:

the machine to machine equipment (M2ME) establishing a connection with a registered operator (RO) through a trusted environment (TRE) functional entity, and the RO registering the M2ME in a new selected home operator (SHO);

after the verification of the M2ME by the new SHO via the platform validation Authority (PVA) is passed successfully, the new SHO sending a new International Mobile Subscriber Identity (IMSI) to the RO or authorizing the RO to provide a new IMSI;

the RO sending the new IMSI to the M2ME with a connection established by the TRE functional entity;

the M2ME using the new IMSI to replace the old IMSI in the Universal Integrated Circuit Card (UICC);

wherein the UICC and the TRE functional entity are located in the M2ME.

The aforementioned method might also have the following feature:

before performing the step of the M2ME establishing a connection with the RO via the TRE functional entity, also performing:

after the RO receives the old IMSI information of the M2ME, the RO activating the TRE functional entity in the M2ME with the connection provided by the old SHO.

The aforementioned method might also have the following feature:

before performing the step of the M2ME establishing a connection with the RO via the TRE functional entity, also performing:

after the old SHO receives the old IMSI information of the M2ME, the old SHO activating the TRE functional entity in the M2ME with the connection currently in use or by means of the over-the-air (OTA).

The aforementioned method might also have the following feature:

the M2ME establishing a connection with the RO via the TRE functional entity, the step of the RO registering the M2ME in the new SHO comprises:

the M2ME establishing an initial connection with a selected visited network operator (VNO) via the TRE functional entity;

the VNO contacting with the RO, and sending a provisional connectivity identity (PCID) received from the M2ME to the RO;

the RO generating a set of authentication vectors according to the PCID and sending them to the said VNO;

the VNO using the authentication vectors to authenticate the PCID and the M2ME, after the authentication is passed successfully, the VNO providing the M2ME with the IP connection to the RO;

the M2ME contacting with the RO with the IP connection provided by the VNO;

the RO discovering the new SHO for the M2ME, or, the M2ME discovering the new SHO via the RO;

the RO connecting with the new SHO, and registering the M2ME in the new SHO.

The aforementioned method might also have the following feature:

in the step of the new SHO sending the new IMSI to the RO or authorizing the RO to provide a new IMSI, the new SHO also sending the subscription key of the new SHO and the corresponding OTA key to the RO, or the new SHO authorizing the RO to provide the M2ME with the subscription key of the new SHO and the corresponding OTA key;

in the step of the RO sending the new IMSI to the M2ME, the RO also sending the subscription key of the new SHO and the corresponding OTA key to the M2ME.

The aforementioned method might also have the following feature:

after the step of the M2ME using the new IMSI to replace the old IMSI in the UICC, also performing:

the M2ME resetting and activating the MCIM in the UICC.

In order to solve the aforementioned technical problem, the present invention provides a system for changing the selected home operator of a machine to machine (M2M) equipment, comprising: a machine to machine equipment (M2ME), a new selected home operator (SHO), an old SHO, a platform validation Authority (PVA) and a registered operator (RO), wherein:

the M2ME is set to establish a connection with the RO via a trusted environment (TRE) functional entity, and to use the received new International Mobile Subscriber Identity (IMSI) to replace the old IMSI in the Universal Integrated Circuit Card (UICC);

the RO is set to register the M2ME in the new SHO, and, when receiving the new IMSI sent by the new SHO or receiving the authorization of the new SHO, with the connection established by the TRE functional entity, to send the new IMSI to the M2ME;

the new SHO is set to send the new IMSI to the RO or to authorize the RO to provide a new IMSI to the M2ME after the verification of the M2ME by the PVA passes;

wherein the UICC and the TRE functional entity are located in the M2ME.

The aforementioned system might also have the following feature:

the RO is further set to activate the TRE functional entity in the M2ME with the connection provided by the old SHO after receiving the old IMSI information of the M2ME.

The aforementioned system might also have the following feature:

the old SHO is set to activate the TRE functional entity in the M2ME with the connection in use or by means of the over-the-air (OTA) after receiving the old IMSI information of the M2ME.

The aforementioned system might also have the following feature:

the new SHO is further set to send the subscription key of the new SHO and the corresponding OTA key to the RO, or to authorize the RO to provide the M2ME with the subscription key of the new SHO and the corresponding OTA key;

the RO is further set to send the subscription key of the new SHO and the corresponding OTA key to the M2ME.

The present invention combines the M2ME with the initial connection provided by the TRE functional entity and the high security of the UICC, to achieve the change of the SHO of the M2ME and to ensure the security of the IMSI and the MCIM.

PREFERRED EMBODIMENTS OF THE PRESENT INVENTION

In the present invention, the TRE functional entity and the UICC are combined together to change the selected home operator of a M2ME and to ensure the security of the MCIM. The method for changing the SHO is as follows:

The M2ME establishes a connection with a RO with the TRE functional entity, the RO registers the M2ME in the new SHO; after the verification of the M2ME by the PVA is passed successfully, the new SHO sends the new IMSI to the RO or authorizes the RO to provide a new IMSI; the RO sends the new IMSI to the M2ME with the connection established by the TRE functional entity; the M2ME uses the new IMSI to replace the old IMSI in the UICC;

the UICC and the TRE functional entity are located in the M2ME.

it might be the RO activating the TRE functional entity in the M2ME, or it might be the old SHO activating the TRE functional entity in the M2ME.

Preferably, in the step of the new SHO sending the new IMSI to the RO or authorizing the RO to provide a new IMSI, the new SHO also sends the subscription key of the new SHO and the corresponding OTA key to the RO, or the new SHO authorizes the RO to provide the M2ME with the subscription key of the new SHO and the corresponding OTA key; in the step of the RO sending the new IMSI to the M2ME, the RO also sends the subscription key of the new SHO and the corresponding OTA key to the M2ME.

In the following, the present invention is described in detail with combination of the accompanying drawings and specific embodiments.

Figure 1:
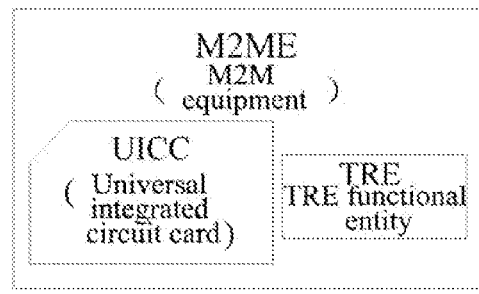
FIG. 1 is a structural diagram of a M2ME of the UICC (the TRE functional entity is in the M2ME) in accordance with an embodiment of the present invention.

FIG. 1 is a structural diagram of the M2ME architecture based on UICC (the TRE functional entity is located in the M2ME) in accordance with an embodiment of the present invention. In this architecture, the TRE functional entity is located in the M2ME, and, the UICC is installed in the M2ME.

Figure 2:
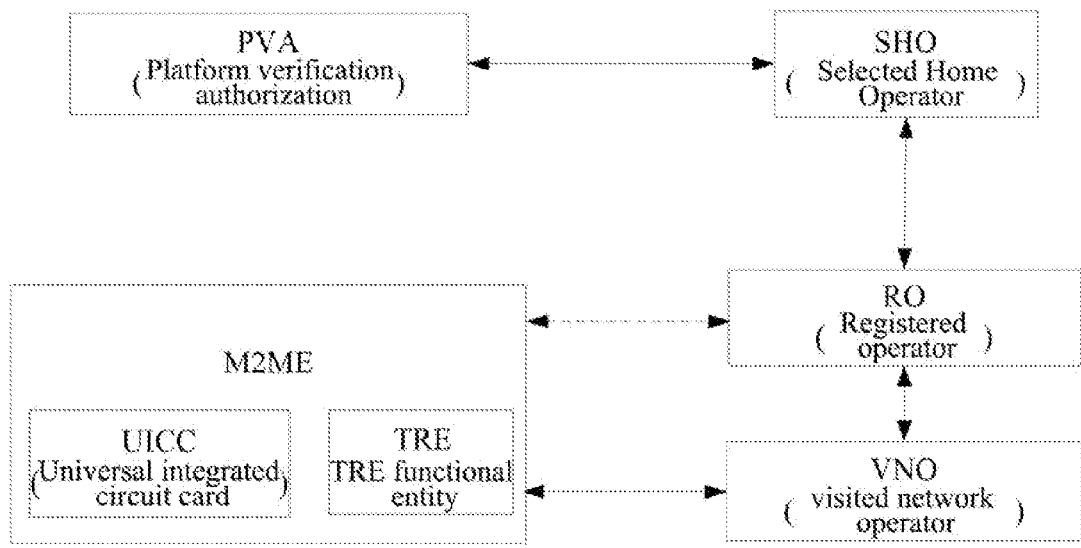
FIG. 2 is a structural diagram of a M2M system of the UICC (the TRE functional entity is in the M2ME) in accordance with an embodiment of the present invention.

FIG. 2 is a structural diagram of the M2M system based on the UICC (the TRE functional entity is located in the M2ME) in accordance with an embodiment of the present invention.

The M2ME takes a PICD (Provisional Connectivity Identity) as its private identity. In order to register the M2ME into a 3GPP network that is not related to the to-be-selected home operator, the PCID needs to be installed in the M2ME via the manufacturer. The PCID format is the same as the IMSI. The TRE functional entity is a trusted environment provided by the M2ME, it provides software and hardware based protection and isolation for providing, storing, executing and managing the MCIM, and the security of the PCID is also guaranteed by the TRE functional entity, for example, the secure storage, discovery and use of the PCID are implemented by the TRE functional entity. An external authorized agent might verify a TRE functional entity at any time. The UICC is installed in the M2ME.

The VNO (Visited Network Operator) provides the initial connection to the M2ME for the initial registration, the MCIM and the trusted provision.

The RO might have the following functions:
1) MCIM Download and Provisioning Function (DPF);
2) Discovery and Registration Function (DRF);
3) Initial Connectivity Function (ICF).

The SHO provides operation services to the M2ME, authorizes the DPF to provide the M2ME with the MCIM generated by SHO or the MCIM generated by DPF on behalf of the SHO.

The PVA is used to verify the M2ME.

In the present invention, when the MCIM is in the UICC, the MCIM means the USIM/ISIM. For convenience of description, in the present invention, regardless whether the MCIM is located in the UICC or not, only the MCIM rather than the USIM/ISIM is used.

In the present invention, both the UICC and the TRE functional entity are located in the M2ME. The initial MCIM can be pre-installed in the UICC, or be installed in the UICC with a remotely provided method. The TRE functional entity is used by the M2ME to establish an initial connection with the visited network operator (VNO) when the initial MCIM is installed in the UICC with a remotely provided method.

Figure 3:
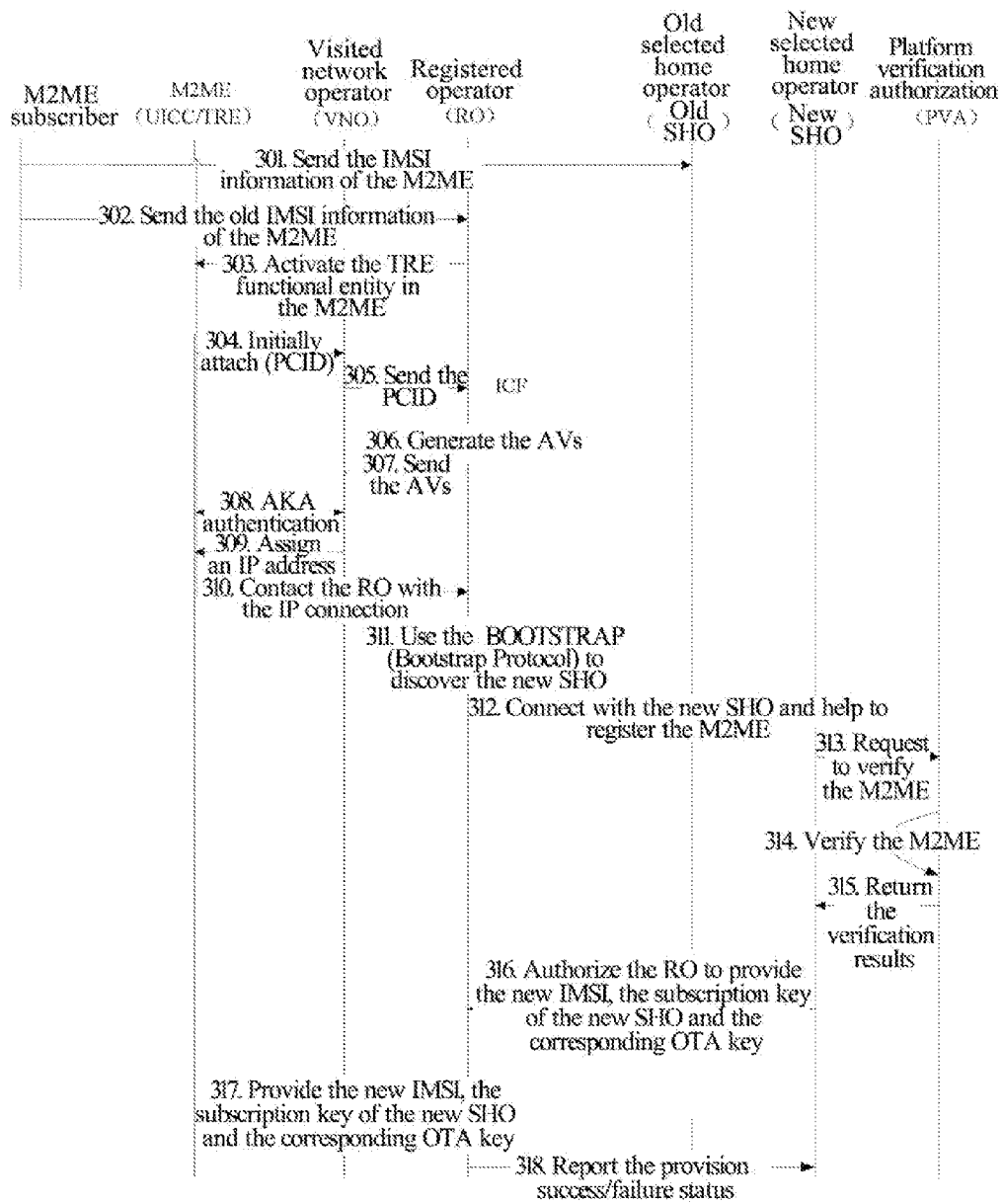
FIG. 3 is a flow chart of changing the SHO of a M2ME via the RO in accordance with an embodiment of the present invention.

FIG. 3 is a flow chart of changing the SHO of a M2ME based on the UICC by the RO in accordance with an embodiment of the present invention.

As shown in FIG. 3, the UICC and the TRE functional entity are located in the M2ME, and the MCIM of the old SHO is installed in the UICC. When the M2ME subscriber wants to change the SHO because the contract of the M2ME subscriber with the old SHO expires or due to other reasons, the M2ME subscriber contacts the old SHO and the RO to change the SHO of the M2ME. The specific process of changing the SHO of the M2ME comprises the following steps:

Step 301: when the M2ME subscriber wants to change the SHO because the contract between the M2ME subscriber and the old SHO expires, the M2ME subscriber contacts the old SHO and sends the old IMSI information of the M2ME that needs to change the SHO to the old SHO. The M2ME subscriber might also contact the new SHO, and send the old IMSI information of the M2ME that needs to change to the old SHO via the new SHO.

When the M2ME subscriber has a plurality of M2MEs which need to change the SHO, the M2ME subscriber might send the IMSI list of all the M2MEs that need to change the SHO to the old SHO, or send the list to the old SHO via the new SHO.

Step 302: the M2ME subscriber contacts the RO and sends the newly subscribed SHO information and the old IMSI information of the M2MEs that need to change the SHO.

Step 303: The RO contacts the M2ME with the connection provided by the old SHO to activate the TRE functional entity in the M2ME.

Step 304: the M2ME establishes an initial connection with a randomly selected VNO via the TRE functional entity. The M2ME decodes the network information and attaches the information to any VNO by the standard GSM/UMTS principles. In the attached message, the M2ME sends a PCID (Provisional Connectivity ID) to the VNO.

Step 305: the VNO contacts the RO (ICF function) and sends the PCID to the RO (ICF function). Note that in some cases, the RO might be located in the VNO.

Step 306: after the RO (ICF function) receives the PCID, it generates a set of authentication vectors (AVs) for the PCID.

Step 307: The RO sends the generated authentication vectors (AVs) to the VNO.

Step 308: The VNO uses the AVs to authenticate the PCID/M2ME, it might use but be not limited to the AKA (Authentication and Key Agreement) authentication.

Step 309: After the authentication is successful, the VNO provides the M2ME with the IP connection to the RO. The VNO assigns an IP address to the M2ME.

Step 310: the M2ME contacts the RO via the IP connection provided by the VNO network.

Step 311: With the help of the RO, the M2ME discovers the new SHO, or, the RO itself discovers the new SHO for the M2ME. The new SHO discovery process might use the OMA (Open Mobile Alliance) BOOTSTRAP (Bootstrap Protocol).

Step 312: the RO connects with the new SHO and registers the M2ME that would connect to the new SHO network into the new SHO.

Step 313: The new SHO requests the PVA (or requests PVA via the RO) to verify the authenticity and integrity of the M2ME.

Step 314: The PVA verifies the authenticity and integrity of the M2ME.

Step 315: The PVA sends the verification results to the new SHO.

Step 316: If the verification is successful, the new SHO contacts the RO and authorizes the RO (DPF feature) to provide the IMSI to the M2ME. Meanwhile, it might also authorize the RO to provide the M2ME with the subscription key of the new SHO and the corresponding new OTA key.

The IMSI of the new SHO, the subscription key and the corresponding OTA key can be sent by the new SHO to the RO, or generated by the RO with the authorization of the new SHO.

Step 317: The RO (DPF function) sends the IMSI of the new SHO, the subscription key of the new SHO and the corresponding OTA key to the M2ME to replace the old IMSI in the UICC, the subscription key of the old SHO and the corresponding old OTA key, at the final stage of the replacement, resets and activates the MCIM in the UICC.

Step 318: the RO (DPF function) reports the provision success/failure status to the old SHO and the new SHO.

Figure 4:
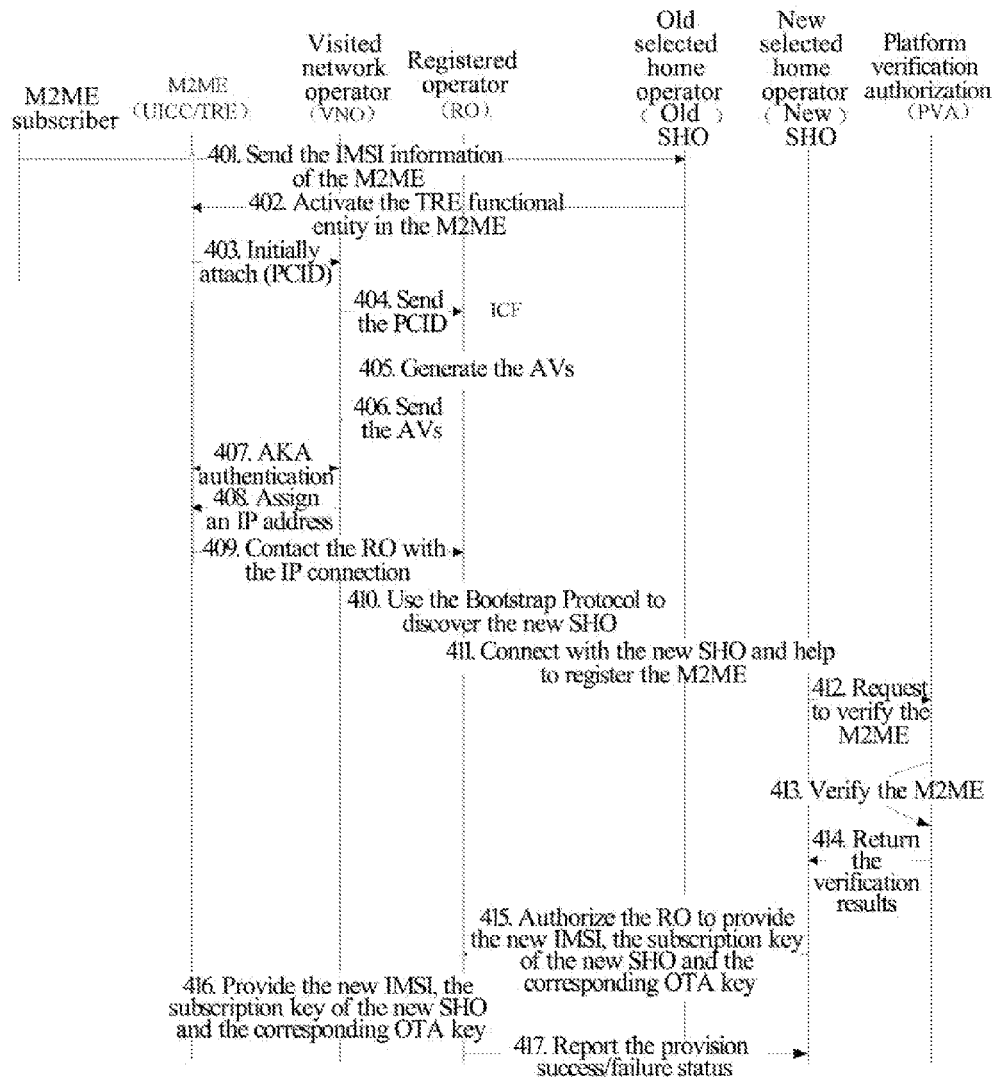
FIG. 4 is a flow chart of changing the SHO of a M2ME via the old SHO in accordance with an embodiment of the present invention.

FIG. 4 is a flow chart of changing the SHO of the UICC based M2ME via the old SHO in accordance with an embodiment of the present invention.

As shown in FIG. 4, the UICC and the TRE functional entity are located on the M2ME, and the MCIM of the old SHO is installed in the UICC. When the M2ME subscriber wants to change the SHO because the contract between the M2ME subscriber and the old SHO expires or due to other reasons, the M2ME subscriber contacts the old SHO to change the SHO of the M2ME. The specific process of changing the SHO of the M2ME comprises the following steps:

step 401: the contract between the M2ME subscriber and the old SHO expires and the M2ME subscriber wants to change the SHO, then the M2ME subscriber contacts the old SHO, and sends the old IMSI information of the M2ME that needs to change the SHO to the old SHO. The M2ME subscriber might also contact the new SHO, and then the new SHO sends the old IMSI information of the M2ME that needs to change to the SHO to the old SHO.

When the M2ME subscriber has a plurality of M2MEs that need to change the SHO, the M2ME subscriber can send the IMSI list of all the M2MEs that need to change the SHO to the old SHO, or send the IMSI list of all the M2MEs that need to change the SHO to the old SHO via the new SHO.

Step 402: the old SHO contacts the M2ME by the connection in use to activate the TRE functional entity in the M2ME.

The connection in use is the old SHO connection currently being used by the MCIM via the old M2ME.

Step 403: the M2ME establishes an initial connection with a randomly selected VNO via the TRE functional entity. The M2ME decodes the network information via the standard GSM/UMTS principles and attaches the information to any VNO. In the attached message, the M2ME sends a PCID to the VNO.

Step 404: The VNO contacts the RO (ICF function) and sends the PCID to the RO (ICF function). Note that in some cases, the RO can be located in the VNO.

Step 405: after the RO (ICF function) receives the PCID, it generates a set of authentication vectors (AVs) for the PCID.

Step 406: the RO sends the generated authentication vectors (AVs) to the VNO.

Step 407: The VNO uses the AVs to authenticate the PCID/M2ME, it might use but be not limited to the AKA authentication.

Step 408: After the authentication is successful, the VNO provides the M2ME with the IP connection to the RO. The VNO assigns an IP address to the M2ME.

Step 409: the M2ME contacts the RO with the IP connection provided by the VNO network.

Step 410: with the help of the RO, the M2ME discovers the new SHO, or, the RO itself discovers the new SHO for the M2ME. The new SHO discovery process can use the OMA BOOTSTRAP.

Step 411: the RO connects with the new SHO and registers the M2ME, which would connect with the new SHO network, to the new SHO.

Step 412: The new SHO requests the PVA (or requests the PVA via the RO) to verify the authenticity and integrity of the M2ME.

Step 413: The PVA verifies the authenticity and integrity of the M2ME.

Step 414: The PVA sends the verification results to the new SHO.

Step 415: If the verification is successful, the new SHO contacts the RO and authorizes the RO (DPF feature) to provide the IMSI to the M2ME. Meanwhile, it might authorize the RO to provide the M2ME with the subscription key of the new SHO and the corresponding new OTA key.

The IMSI of the new SHO, the subscription key and the corresponding OTA key can be sent by the new SHO to the RO, or generated by the RO with the authorization of the new SHO.

Step 416: the RO (DPF function) sends the IMSI of the new SHO, the subscription key of the new SHO and the corresponding OTA key to the M2ME to replace the old IMSI in the UICC, the subscription key of the old SHO and the corresponding old OTA key, at the final stage of the replacement, resets and activates the MCIM in the UICC.

Step 417: The RO (DPF function) reports the provision success/failure status to the old SHO and the new SHO.

Figure 5:
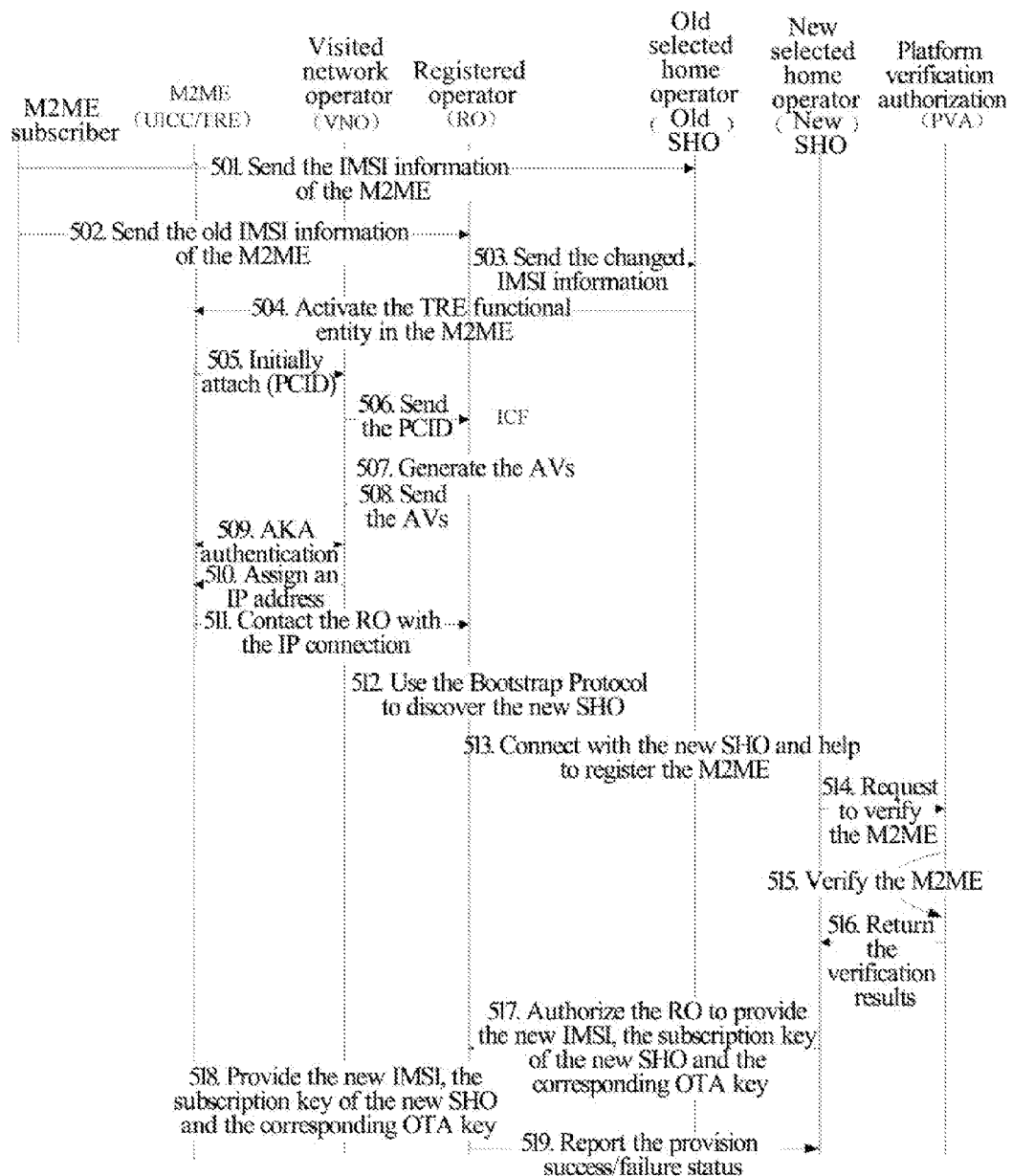
FIG. 5 is a flow chart of changing the SHO of a M2ME by means of the RO using the OTA (Over The Air)

FIG. 5 is a flow chart of changing the SHO of the M2ME by the RO using the OTA in accordance with an embodiment of the present invention.

As shown in FIG. 5, the UICC and the TRE functional entity are located in the M2ME, and the UICC is installed with the MCIM of the old SHO. When the M2ME subscriber wants to change the SHO because the contract between the M2ME subscriber and the old SHO expires or due to other reasons, the M2ME subscriber contacts the old SHO, the new SHO and the RO, to change the SHO of the M2ME. The specific process of changing the SHO of the M2ME comprises the following steps:

step 501: when the M2ME subscriber wants to change the SHO because the contract between the M2ME subscriber and the old SHO expires, the M2ME subscriber contacts the old SHO and sends the old IMSI information of the M2ME that needs to change the SHO to the old SHO. It might also contact the new SHO, and the new SHO sends the old IMSI information of the M2ME that needs to change the SHO to the old SHO.

When the M2ME subscriber has a plurality of M2MEs that need to change the SHO, the M2ME subscriber can send the IMSI list of all the M2MEs that need to change the SHO to the old SHO, or send the IMSI list of all the M2MEs that need to change the SHO to the old SHO via the new SHO.

Step 502: the M2ME subscriber contacts the RO and sends the new subscribed SHO information and the IMSI information of the M2ME that needs to change the SHO.

Step 503: the RO contacts the old SHO and notifies the old SHO of the IMSI information of the M2ME that needs to change the SHO.

Step 504: the old SHO activates the TRE functional entity in the M2ME by means of the OTA.

Step 505: the M2ME establishes an initial connection with a randomly selected VNO via the TRE functional entity. The M2ME decodes the network information via the standard GSM/UMTS principles and attaches the information to any VNO. In the attached message, the M2ME sends a PCID to the VNO.

Step 506: the VNO contacts the RO (ICF function) and sends the PCID to the RO (ICF function). Note that in some cases, the RO might be located in the VNO.

Step 507: after the RO (ICF function) receives the PCID, it generates a set of authentication vectors (AVs) for the PCID.

Step 508: The RO sends the generated authentication vectors (AVs) to the VNO.

Step 509: The VNO uses the AVs to authenticate the PCID/M2ME, it might use but be not limited to the AKA authentication.

Step 510: After the authentication is successful, the VNO provides the M2ME with the IP connection to the RO. The VNO assigns an IP address to the M2ME.

Step 511: the M2ME contacts the RO through the IP connection provided by the VNO network.

Step 512: with the help of the RO, the M2ME discovers the new SHO, or, the RO itself discovers the new SHO for the M2ME. The new SHO discovery process might use the OMA BOOTSTRAP.

Step 513: the RO connects with the new SHO and registers the M2ME that needs to connect with the new SHO network to the new SHO.

Step 514: The new SHO requests the PVA (or requests the PVA via the RO) to verify the authenticity and integrity of the M2ME.

Step 515: the PVA verifies the authenticity and integrity of the M2ME.

Step 516: the PVA sends the verification results to the new SHO.

Step 517: If the verification is successful, the new SHO contacts the RO (DPF function) and authorizes the RO to provide the IMSI to the M2ME. Meanwhile, it might authorize the RO to provide the M2ME with the subscription key of the new SHO and the corresponding new OTA key.

The IMSI of the new SHO, the subscription key and the corresponding OTA key can be sent by the new SHO to the RO, or generated by the RO with the authorization of the new SHO.

Step 518: the RO (DPF function) sends the IMSI of the new SHO, the subscription key of the new SHO and the corresponding OTA key to the M2ME to replace the old IMSI in the UICC, the subscription key of the old SHO and the corresponding old OTA key, at the final stage of the replacement, resets and activates the MCIM on the UICC.

Step 519: The RO (DPF function) reports the provision success/failure status to the old SHO and the new SHO.

Figure 6:
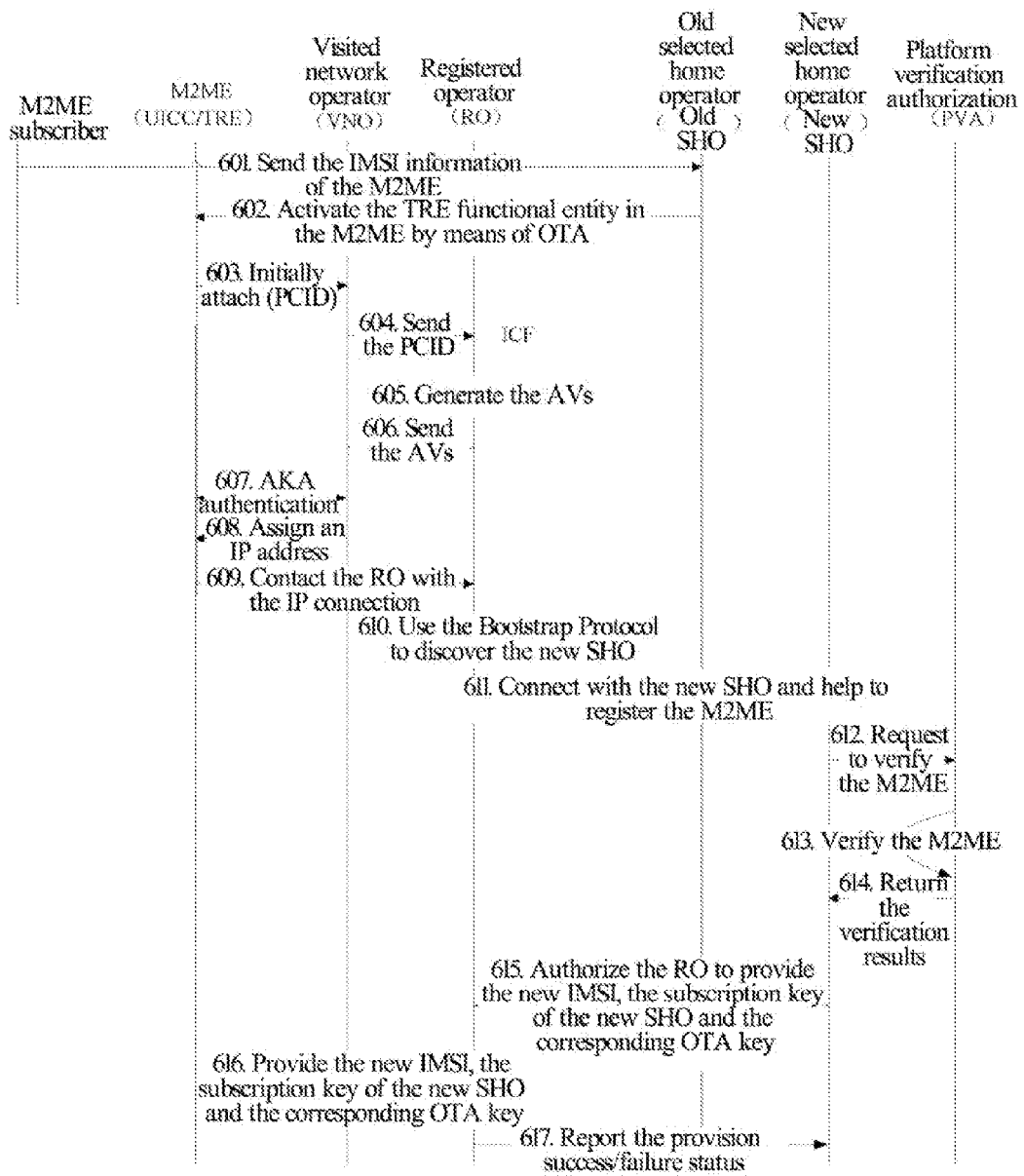
FIG. 6 is a flow chart of changing the SHO of a M2ME by means of the old SHO using the OTA (Over The Air).

FIG. 6 is a flow chart of changing the SHO of the M2ME by the old SHO using the OTA in accordance with an embodiment of the present invention.

As shown in FIG. 6, the UICC and the TRE functional entity are located in the M2ME, and the MCIM of the old SHO is installed in the UICC. When the M2ME subscriber wants to change the SHO because the contract between the M2ME subscriber and the old SHO expires or due to other reasons, the M2ME subscriber contracts the old SHO to change the SHO of the M2ME. The specific process of changing the SHO of the M2ME comprises the following steps:

step 601: when the M2ME subscriber wants to change the SHO because the contract between the M2ME subscriber and the old SHO expires, the M2ME subscriber contacts the old SHO and sends the old IMSI information of the M2ME that needs to change the SHO to the old SHO. It might also contact the new SHO, and the new SHO sends the old IMSI information of the M2ME that needs to change the SHO to the old SHO.

When the M2ME subscriber has a plurality of M2M equipments that need to change the SHO, the M2ME subscriber can send the IMSI list of all the M2MEs that need to change the SHO to the old SHO, or send the IMSI list of all the M2MEs that need to change the SHO to the old SHO via the new SHO.

Step 602: the old SHO activates the TRE functional entity in the M2ME by means of the OTA.

Step 603: the M2ME establishes an initial connection with a randomly selected VNO via the TRE functional entity. The M2ME decodes the network information via the standard GSM/UMTS principles and attaches the information to any VNO. In the attached message, the M2ME sends a PCID to the VNO.

Step 604: the VNO contacts the RO (ICF function) and sends the PCID to the RO (ICF function). Note that in some cases, the RO might be located in the VNO.

Step 605: after the RO (ICF function) receives the PCID, it generates a set of authentication vectors (AVs) for the PCID.

Step 606: The RO sends the generated authentication vectors (AVs) to the VNO.

Step 607: The VNO uses the AVs to authenticate the PCID/M2ME, it might use but be not limited to the AKA authentication.

Step 608: After the authentication is successful, the VNO provides the M2ME with the IP connection to the RO. The VNO assigns an IP address to the M2ME.

Step 609: the M2ME contacts the RO through the IP connection provided by the VNO network.

Step 610: with the help of the RO, the M2ME discovers the new SHO, or, the RO itself discovers the new SHO for the M2ME. The new SHO discovery process might use the OMA BOOTSTRAP.

Step 611: the RO connects with the new SHO and registers the M2ME that needs to connect with the new SHO network to the new SHO.

Step 612: The new SHO requests the PVA (or requests the PVA via the RO) to verify the authenticity and integrity of the M2ME.

Step 613: the PVA verifies the authenticity and integrity of the M2ME.

Step 614: the PVA sends the verification results to the new SHO.

Step 615: If the verification is successful, the new SHO contacts the RO (DPF feature) and authorizes the RO to provide the IMSI to the M2ME. Meanwhile, it might authorize the RO to provide the M2ME with the subscription key of the new SHO and the corresponding new OTA key.

The IMSI of the new SHO, the subscription key and the corresponding OTA key can be sent by the new SHO to the RO, or generated by the RO with the authorization of the new SHO.

Step 616: the RO (DPF function) sends the IMSI of the new SHO, the subscription key of the new SHO and the corresponding OTA key to the M2ME to replace the old IMSI in the UICC, the subscription key of the old SHO and the corresponding old OTA key, at the final stage of the replacement, resets and activates the MCIM in the UICC.

Step 617: The RO (DPF function) reports the provision success/failure status to the old SHO and the new SHO.

The system for changing the SHO of a M2ME in accordance with an embodiment of the present invention comprises: the M2ME, the new SHO, the old SHO, the PVA, and the RO, wherein:

The M2ME is set to establish a connection with the RO via the TRE functional entity, and, to use the received new IMSI to replace the old IMSI in the UICC;

the RO is set to register the M2ME to the new SHO, and, when receiving the new IMSI sent by the SHO or receiving the authorization of the new SHO, it sends the new IMSI to the M2ME with the connection established by the TRE functional entity;

the new SHO is set, after the verification of the M2ME by the PVA is passed successfully, to send the new IMSI to the RO or authorize the RO to provide a new IMSI to said M2ME;

the UICC and the TRE functional entity are located in the M2ME.

Preferably, the RO is further set, after receiving the old IMSI information of the M2ME, to activate the TRE functional entity in the M2ME with the connection provided by the old SHO.

Preferably, the old SHO is set, after receiving the old IMSI information of the M2ME, to activate the TRE functional entity in the M2ME with the connection in use or by means of OTA.

Preferably, the new SHO is further set to send the subscription key of the new SHO and the corresponding OTA key to the RO, or to authorize the RO to provide the M2ME with the subscription key of the new SHO and the corresponding OTA key; the RO is further set to send the subscription key of the new SHO and the corresponding OTA key to the M2ME.

Although the present invention is described with combination of the specific embodiments, for those skilled in the field, the present invention can be modified or improved without departing from the spirit and essence of the present invention. All these types of modification or variations should belong to the scope of the claims of the present invention.

Industrial Applicability

The present invention provides a method and a system for changing the SHO of a M2ME to combine the M2ME with the initial connection provided by the TRE functional entity and the high security of the UICC, so as to achieve the change of the SHO of the M2ME and ensure the security of the IMSI and the MCIM.

What is claimed is:

1. A method for changing a selected home operator (SHO) of a machine to machine (M2M) equipment, comprising:
the machine to machine equipment (M2ME) establishing a connection with a registered operator (RO) through a trusted environment (TRE) functional entity, and the RO registering the M2ME in a new selected home operator (SHO);
after a verification of the M2ME by the new SHO via a platform Validation Authority (PVA) is passed successfully, the new SHO sending a new International Mobile Subscriber Identity (IMSI) to the RO or authorizing the RO to provide a new IMSI;
the RO sending the new IMSI to the M2ME with a connection established by the TRE functional entity;
the M2ME using the new IMSI to replace an old IMSI in a Universal Integrated Circuit Card (UICC);
wherein, the UICC and the TRE functional entity are located in the M2ME.

2. The method of claim 1, wherein:
before performing the step of the M2ME establishing a connection with the RO via the TRE functional entity, also performing:
after the RO receives the old IMSI information of the M2ME, the RO activating the TRE functional entity in the M2ME with a connection provided by an old SHO.

3. The method of claim 2, wherein:
in the step of the new SHO sending the new IMSI to the RO or authorizing the RO to provide a new IMSI, the new SHO also sends a subscription key of the new SHO and a corresponding OTA key to the RO, or the new SHO authorizes the RO to provide the M2ME with the subscription key of the new SHO and the corresponding OTA key;
in the step of the RO sending the new IMSI to the M2ME, the RO also sends the subscription key of the new SHO and the corresponding OTA key to the M2ME.

4. The method of claim 2, wherein:
after the step of the M2ME using the new IMSI to replace the old IMSI in the UICC, also performing:
the M2ME resetting and activating a machine communication identity module (MCIM) in the UICC.

5. The method of claim 1, wherein:
before performing the step of the M2ME establishing a connection with the RO via the TRE functional entity, also performing:
after the old SHO receives the old IMSI information of the M2ME, the old SHO activating the TRE functional entity in the M2ME with a connection currently in use or by means of over-the-air (OTA).

6. The method of claim 5, wherein:
in the step of the new SHO sending the new IMSI to the RO or authorizing the RO to provide a new IMSI, the new SHO also sends a subscription key of the new SHO and a corresponding OTA key to the RO, or the new SHO authorizes the RO to provide the M2ME with the subscription key of the new SHO and the corresponding OTA key;
in the step of the RO sending the new IMSI to the M2ME, the RO also sends the subscription key of the new SHO and the corresponding OTA key to the M2ME.

7. The method of claim 5, wherein:
after the step of the M2ME using the new IMSI to replace the old IMSI in the UICC, also performing:
the M2ME resetting and activating a machine communication identity module (MCIM) in the UICC.

8. The method of claim 1, wherein:
the M2ME establishes a connection with the RO via the TRE functional entity, the step of the RO registering the M2ME in the new SHO comprises:
the M2ME establishing an initial connection with a selected visited network operator (VNO) via the TRE functional entity;
the VNO contacting the RO, and sending a provisional connectivity identity (PCID) received from the M2ME to the RO;
the RO generating a set of authentication vectors for the PCID to send to the VNO;
the VNO using the authentication vectors to authenticate the PCID and the M2ME, after the authentication is passed successfully, the VNO providing the M2ME with the IP connection to the RO;
the M2ME contacting the RO via the IP connection provided by the VNO;
the RO discovering a new SHO for the M2ME, or, the M2ME discovering a new SHO via the RO;
the RO connecting with the new SHO, and registering the M2ME in the new SHO.

9. The method of claim 8, wherein:
in the step of the new SHO sending the new IMSI to the RO or authorizing the RO to provide a new IMSI, the new SHO also sends a subscription key of the new SHO and a corresponding OTA key to the RO, or the new SHO authorizes the RO to provide the M2ME with the subscription key of the new SHO and the corresponding OTA key;
in the step of the RO sending the new IMSI to the M2ME, the RO also sends the subscription key of the new SHO and the corresponding OTA key to the M2ME.

10. The method of claim 8, wherein:
after the step of the M2ME using the new IMSI to replace the old IMSI in the UICC, also performing:
the M2ME resetting and activating a machine communication identity module (MCIM) in the UICC.

11. The method of claim 1, wherein:
in the step of the new SHO sending the new IMSI to the RO or authorizing the RO to provide a new IMSI, the new SHO also sends a subscription key of the new SHO and a corresponding OTA key to the RO, or the new SHO authorizes the RO to provide the M2ME with the subscription key of the new SHO and the corresponding OTA key;
in the step of the RO sending the new IMSI to the M2ME, the RO also sends the subscription key of the new SHO and the corresponding OTA key to the M2ME.

12. The method of claim 1, wherein:
after the step of the M2ME using the new IMSI to replace the old IMSI in the UICC, also performing:
the M2ME resetting and activating a machine communication identity module (MCIM) in the UICC.

13. A system for changing a selected home operator of a machine to machine (M2M) equipment, comprising:
a machine to machine equipment (M2ME), a new selected home operator (SHO), an old SHO, a platform validation Authority (PVA) and a registered operator (RO), wherein:
the M2ME is set to establish a connection with the RO via a trusted environment (TRE) functional entity, and to use a received new International Mobile Subscriber Identity (IMSI) to replace an old IMSI in a Universal Integrated Circuit Card (UICC);
the RO is set to register the M2ME in the new SHO, and, when receiving the new IMSI sent by the new SHO or receiving an authorization of the new SHO, with the connection established by the TRE functional entity, to send the new IMSI to the M2ME;
the new SHO is set to send the new IMSI to the RO or to authorize the RO to provide the new IMSI to the M2ME after a verification of the M2ME by the PVA passes;
the UICC and the TRE functional entity are located in the M2ME.

14. The system of claim 13, wherein:
the RO is further set to activate the TRE functional entity in the M2ME with the connection provided by the old SHO after receiving the old IMSI information of the M2ME.

15. The system of claim 14, wherein:
the new SHO is further set to send a subscription key of the new SHO and a corresponding OTA key to the RO, or to authorize the RO to provide the M2ME with the subscription key of the new SHO and the corresponding OTA key;
the RO is further set to send the subscription key of the new SHO and the corresponding OTA key to the M2ME.

16. The system of claim 13, wherein:
the old SHO is set to activate the TRE functional entity in the M2ME with a connection currently in use or by means of over-the-air (OTA) after receiving the old IMSI information of the M2ME.

17. The system of claim 16, wherein:
the new SHO is further set to send a subscription key of the new SHO and a corresponding OTA key to the RO, or to authorize the RO to provide the M2ME with the subscription key of the new SHO and the corresponding OTA key;
the RO is further set to send the subscription key of the new SHO and the corresponding OTA key to the M2ME.

18. The system of claim 13, wherein:
the new SHO is further set to send a subscription key of the new SHO and a corresponding OTA key to the RO, or to authorize the RO to provide the M2ME with the subscription key of the new SHO and the corresponding OTA key;
the RO is further set to send the subscription key of the new SHO and the corresponding OTA key to the M2ME.

* * * * *